March 25, 1924.
H. S. CARLSON
1,488,148
INDEXING DEVICE FOR MULTIPLE THREAD CUTTING
Filed April 24, 1922
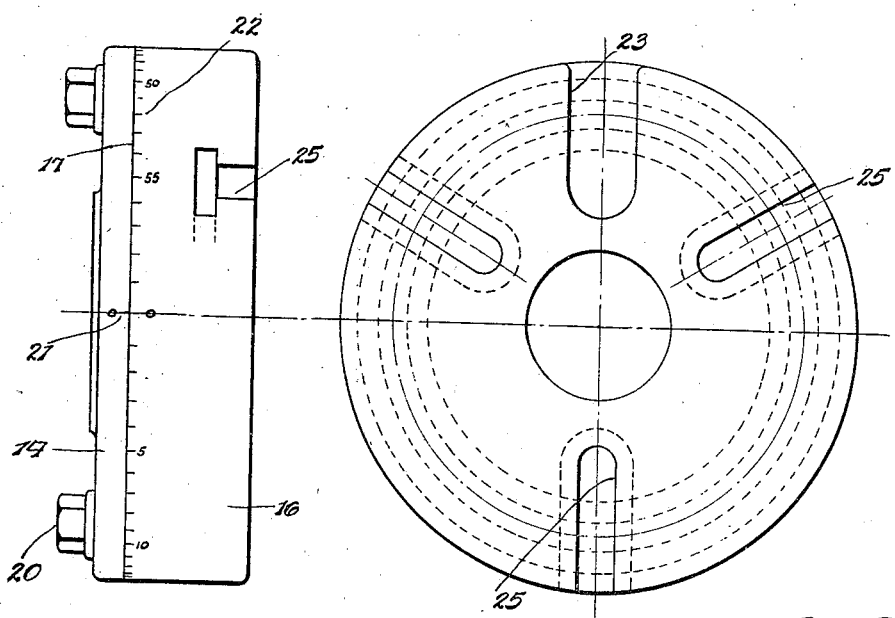
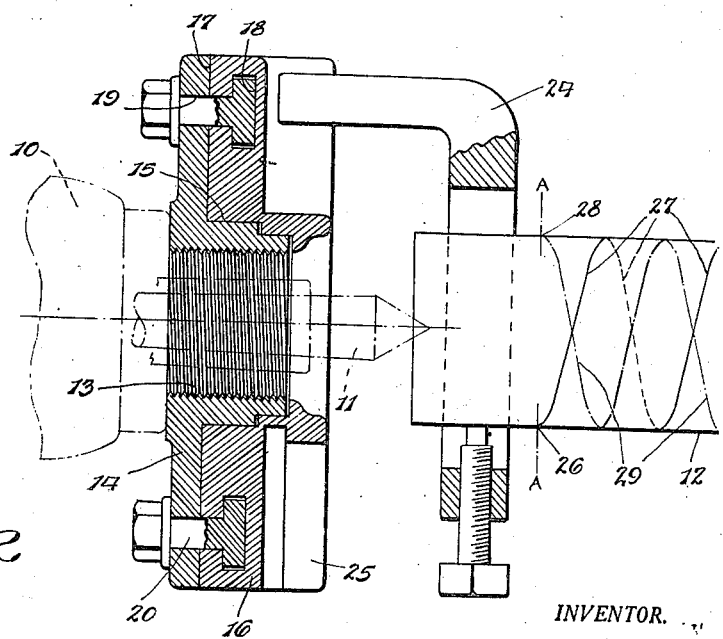
INVENTOR.
Harold S. Carlson.
BY
ATTORNEYS.

Patented Mar. 25, 1924.

1,488,148

UNITED STATES PATENT OFFICE.

HAROLD S. CARLSON, OF DANBURY, CONNECTICUT.

INDEXING DEVICE FOR MULTIPLE-THREAD CUTTING.

Application filed April 24, 1922. Serial No. 556,230.

*To all whom it may concern:*

Be it known that I, HAROLD S. CARLSON, citizen of the United States, residing at Danbury, in the county of Fairfield and State of Connecticut, have invented certain new and useful Improvements in Indexing Devices for Multiple-Thread Cutting, of which the following is a specification.

My invention relates to a lathe attachment for use in cutting multiple threads on a bar or in a hollow cylinder and its main object is to facilitate the setting of the tool in accurate position with relation to the work for obtaining perfect threads.

Ordinarily, it depends upon the operator's care as to how closely he can set his tool to start a second thread for a double threaded screw for instance, after the first thread has been cut, and a few thousandths of an inch to one side in axial direction would easily spoil the work; the practice being to advance the starting point in axial direction for each new thread.

In order to overcome this disadvantage, I furnish a device comprising graduated discs for staring each thread, so that the tool is returned to the same starting point for each new thread, whether the screw is double or triple threaded, or has any other kind of multiple thread, and the work itself is actually set in relation to the tool point instead of the tool point being set to the work. This is done, however, without in the least disturbing the original clamping of the work in the lathe, leaving no chance for error in resetting. In this manner, it becomes very easy to cut double, triple, quadruple, quintuple or sextuple threads without error and with perfect accuracy.

In the accompanying drawing, one embodiment of the invention is illustrated and:

Figure 1 shows a side elevation of my improved device,

Figure 2 shows an axial section of the same as mounted in a lathe with the work attached, and Figure 3 is a front face view of the device.

The reference numeral 10 represents the end of a lathe spindle carrying a center point 11 projecting at the end thereof for receiving the work 12 which, in this case, is represented as a cylindrical bar upon which the multiple thread is to be cut. Upon the threaded end of the lathe spindle is secured, by a corresponding thread 13, a cylindrical disc or back plate 14 having a cylindrical head 15 extending from the side toward the work. This head is preferably made in steps so as to provide a perfect seat for the face plate 16, which is correspondingly recessed for this purpose and has a flat rear face 17 engaging with the corresponding front face of the back plate 14. A T-shaped annular groove 18 is provided in the face plate opening toward the side of the back plate, in which circular apertures 19 are provided for engaging the shanks of T-bolts 20 adapted to rigidly secure the two plates together.

On the outer surface of the two plates, which are of the same diameter, a suitable graduation and index are provided, the index, indicated by the numeral 21, being, in this case, shown on the back plate 14, while the circumferential graduation 22 is shown on the face plate along the edge of its rear face 17. The graduation in this case is shown as consisting of sixty equal divisions ranging from zero to 60, and with the diameter of the discs about four and three-quarters inches, the divisions would each be a quarter of an inch, which will make the setting of the two discs with relation to each other very easy. Naturally, any other number of divisions might be supplied, but, in this case, it will be evident that the setting of any thread of the multiples of 2, 3 and 5 is possible, such as 4, 6, 10, 12, 15, for instance.

On the front face of the face plate is provided a radial groove 23 which is intended to engage a dog 24 for clamping the bar 12 to be threaded, when centered on the center point 11. Other radial grooves 25 are also provided on the face plate and are preferably of T-section, to be used when a hollow cylinder is to be threaded on the inside or for receiving stepped chuck jaws for this purpose.

With the graduation consisting of sixty divisions, as shown in the drawing, the rule for finding the proper setting will be to divide sixty by the numeral of the multiple thread to be cut and this gives the reading on the scale to be set against the zero or index point 21 on the back plate 14. Assuming, for instance, that a double-threaded screw is to be cut, by dividing 60 by 2, the numeral 30 will be the result, and the face plate 16 is then turned on the back plate until 30 stands opposite the index 21. Similarly, if a triple thread is to be cut, 60 is divided by 3, the result being 20; consequently, the graduation line 20 is set opposite the index point 21.

In Figure 2 of the drawing, a double thread of half inch pitch and one inch lead is shown to be cut on the bar 12. For this purpose, when starting the first thread, the zero point of the front plate is set against the index point 21 on the back plate and the tool set to be started at 26 on the line A—A in this figure, when the cutting of the thread along the full line 27 can now be proceeded with. As soon as the first thread has been completed, the bolts 20 are loosened and the face plate 16 is turned on the hub 15 of the back plate until the division line 30 registers with the zero point 21 on the back plate, when the bolts are drawn up tightly. Care must be taken that the dog 24 is not loosened in any manner, or, in the case of a hollow cylinder being threaded, the clamping bolts engaging in the radial T-shaped grooves 25 are not loosened. It will now be evident that the work has been turned 180° with regard to the horizontal plane of the axis thereof and that instead of the point 26 facing toward the tool, the point 28 will be in that position and that the tool point, in starting the second thread, is returned to the same vertical plane A—A at the same distance from the end of the bar 12 and the turning operation restarted, when the tool point, instead of following the helix 27 shown in full lines, will now follow the helix 29 shown in dot and dash lines on the bar 12.

It will be evident that it is much easier to set the work with the aid of the coarse graduation 22 and return the tool every time to the same vertical plane in starting a new thread, than to attempt to divide the linear distance of a lead into two or three parts for a new thread and that the production of very accurate work is, in this manner, greatly facilitated. The device is applicable not only to ordinary thread cutting but to cutting of any other helical grooves such as oil grooves, for instance.

Having thus described the invention, what is claimed as new is:

1. A chuck comprising a face plate with radial grooves for securing the work thereon, a back plate having a forwardly directed hub with a bore adapted for attachment on a revoluble spindle, said plates being cylindrical and provided the one with an index and the other with a circumferential graduation, the exterior surface of said hub being provided with cylindrical steps and said face plate having corresponding steps so as to be mounted upon said hub, and means for clamping the plates together in relative adjustment after being set to said graduation.

2. A chuck comprising a face plate with radial grooves on its front face for securing the work thereon, a back plate having a forwardly directed hub with a bore adapted for attachment on a revoluble spindle, said plates being cylindrical and provided the one with an index and the other with a circumferential graduation, the exterior surface of said hub being provided with cylindrical steps and said face plate having corresponding steps so as to be revolubly mounted upon said hub, said face plate having an annular groove facing the back plate, and bolts engaging in said groove, said back plate being provided with openings adapted to receive said bolts for clamping the plates together.

In testimony whereof I affix my signature

HAROLD S. CARLSON. [L. S.]